J. J. PENHALLEGON.
TIRE CHAIN FASTENER.
APPLICATION FILED JUNE 7, 1921.
1,407,438.
Patented Feb. 21, 1922.
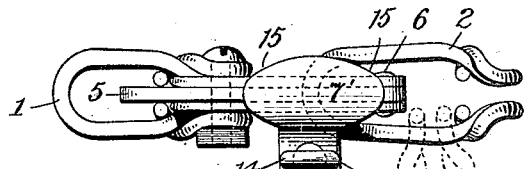
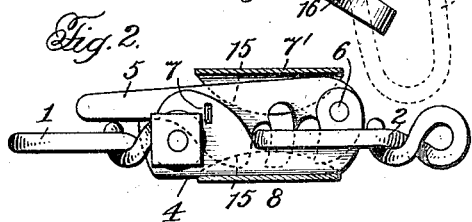
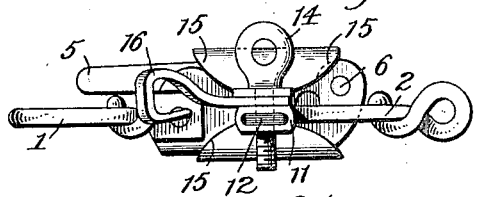
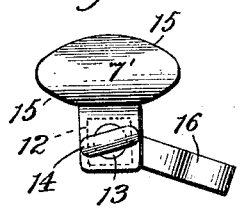
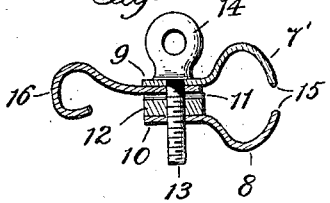
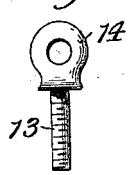
Inventor:
John J. Penhallegon,
By Milans & Milans
Attorneys
Witness:
Jas. E. Hutchinson

UNITED STATES PATENT OFFICE.

JOHN J. PENHALLEGON, OF MINERAL POINT, WISCONSIN.

TIRE-CHAIN FASTENER.

1,407,438. Specification of Letters Patent. Patented Feb. 21, 1922.

Application filed June 7, 1921. Serial No. 475,801.

*To all whom it may concern:*

Be it known that I, JOHN J. PENHALLEGON, a citizen of the United States, residing at Mineral Point, in the county of Iowa and State of Wisconsin, have invented certain new and useful Improvements in Tire-Chain Fasteners, of which the following is a specification, reference being had therein to the accompanying drawing.

My invention relates to new and useful improvements in a tire chain fastener, and more particularly to an attachment in the form of a clamp adapted to lock the fastener against accidental displacement.

The principal object of the invention is the provision of such a clamp which may be sold as a separate unit and which is adjustable to fit fasteners of varying sizes.

Another object resides in the construction of the clamp with means for holding loose links of the chain to prevent them from hitting against the fender or mud guard of the automobile.

A further object consists in shaping the ends of the clamp in such a manner as to allow free movement of the chain links to allow them to conform to the curvature of the tire on which the chain is used.

With the above and other objects in view, which will appear as the description proceeds, my invention consists in the novel details of construction and arrangement of parts described in the following specification and illustrated in the accompanying drawings, and while I have described and illustrated the preferred embodiments of my invention, it will be understood that such changes may be made as will fall within the scope of the appended claims.

In the drawings:—

Figure 1 is a side elevation showing my clamp applied to a chain fastener.

Figure 2 is a horizontal section through the clamp with the fastener shown in plan.

Figure 3 is a bottom plan.

Figure 4 is a detail side elevation of the clamp.

Figure 5 is a transverse section through the clamp.

Figure 6 is a detail elevation of the adjusting bolt.

The ends of tire chains are usually detachably connected by a fastener, one of the well known forms of fasteners employing a lever which not only connects the ends of the chain but also takes up slack therein, the lever being adapted for engagement through the links of the chain. The lever is usually held in fastened position by friction or other similar means, and it has been found that very often the fastener will be disengaged accidentally, thereby causing the chain to fall from the tire and very often causing its loss. At the same time in taking up the slack of the chain the lever is often engaged through links spaced from the end of the chain, thus leaving loose links which hit against the fender or mud guard during the rotation of the wheel. My improved form of clamp is adapted to overcome these disadvantages, and when in position on the fastener will hold the same against accidental displacement and provide means for holding the loose links to prevent them from hitting the mud guard or fender. The clamp is of simple formation and may be sold with the tire chains or as a separate unit, thus adapting it for old chains as well as new, and as it is adjustable may be used with chains of varying sizes.

In the drawings, 1 and 2 indicate the ends of the chain adapted to be connected by the fastener, and 3 indicates a loose link caused by taking up slack in the chain. The fastener consists in the body portion 4 having the lever 5 pivotally connected thereto at 6, said lever, when in lowered position, fitting between the side walls of the body 4 and held therein by frictional engagement or by a projection 7 struck from one of the side walls of the body and engaging in a recess in the side of the lever. The end 1 of the chain is connected to the body 4 and the end 2 is adjustably connected to the fastener by having the lever 5 extending through the link as shown. As the fastener forms no part of the present invention, it is thought that a further detailed description thereof is not necessary at the present time, other than to say that both the body and lever are provided with spaced teeth or projections for receiving the link, said projections allowing an adjustment of the end 2 with respect to the fastener.

My improved locking clamp is adapted to fit around the fastener and securely hold the lever 5 in position with respect to the body 4. The clamp comprises the plates 7′ and 8, curved transversely, as more clearly shown in Fig. 5, to engage around the fastener, the plate 7 having the ear 9 extending from one face thereof and the plate 8 having the ear 10, the edges of which are bent to form the channeled flanges 11 to receive a nut 12 for a purpose to be later described. The ears 9 and 10 are provided with aligned openings to receive the threaded bolt 13 having the enlarged head 14, said bolt being threaded in the nut 12. The ends of the plates 7 and 8 are rounded as shown at 15, to allow for a free swinging movement of the links of the chain to adapt the chain to the curvature of the tire. A hook member 16 is pivotally carried by the bolt 13 between the ears 9 and 10 of the plates 7 and 8, said hook member being adapted for holding the loose link 3, as more clearly shown in Fig. 1 of the drawings.

From the above detailed description, it is thought that the construction and advantages of my clamp will be clearly understood, it being seen that the clamp will securely hold the fastener against accidental displacement and at the same time hold the loose link or links so that they will not hit the fender or mud guard during the rotation of the wheel. The bolt 13 allows the separation of the plates 7 and 8 to a greater or less degree so that the clamp may be adjusted to different sized fasteners, and if for any reason it is desirable not to use the hook member 16, or it should become lost, the loose link might be engaged over the enlarged head 14 of the bolt and held in position. The channeled flanges 11 hold the nut 12 in proper position at all times and prevent the rotation thereof during the introduction or adjustment of the bolt. The rounded ends 15 of the plates, as previously described, allow for a free swinging movement of the links of the chain with respect to the fastener, so as to allow the chain to assume the proper position when on the tire.

Having fully described my invention, what I claim as new and desire to secure by Letters Patent is:—

1. A clamp for tire chain fasteners comprising plates adapted to engage the edges of the fastener, and means for adjustably connecting the plates.

2. A clamp for tire chain fasteners comprising plates adapted to engage the edges of the fastener, means for connecting the plates, and means for engaging the links of the chain.

3. A clamp for tire chain fasteners comprising plates adapted to engage the edges of the fastener, means for connecting the plates, and a hook for engaging links of the chain.

4. A clamp for tire chain fasteners comprising plates adapted to engage the edges of the fastener, means for connecting the plates, and a pivoted hook for engaging links of the chain.

5. A clamp for tire chain fasteners comprising plates adapted to engage the edges of the fastener, ears formed on the plates, and a bolt passing through the ears for adjustably connecting the plates.

6. A clamp for tire chain fasteners comprising plates adapted to engage the edges of the fastener, ears formed on the plates, and a bolt passing through the ears for adjustably connecting the plates, said bolt having an enlarged head for receiving loose links of the chain.

7. A clamp for tire chain fasteners comprising plates adapted to engage the edges of the fastener, ears formed on the plates, means passing through the ears for connecting the plates, and a hook pivotally connected between the ears for engaging loose links of the chain.

8. A clamp for tire chain fasteners comprising plates adapted to engage the edges of the fastener, ears formed on the plates, one of said ears having channeled flanges, a nut carried by the channeled flanges, and a bolt extending through the ears and threaded through the nut for adjustably connecting the plates.

9. A clamp for tire chain fasteners comprising plates adapted to engage the edges of the fastener, ears formed on the plates, one of said ears having channeled flanges, a nut carried by the channeled flanges, a bolt extending through the ears and threaded through the nut for adjustably connecting the plates, and a hook pivotally carried by the bolt between the ears.

In testimony whereof I hereunto affix my signature in the presence of two witnesses.

JOHN J. PENHALLEGON.

Witnesses:
R. J. MARTIN,
WM. P. BLISS.